Aug. 28, 1928.
E. A. SPERRY
1,682,357
INTERNAL COMBUSTION ENGINE CYLINDER
Filed Aug. 10, 1920
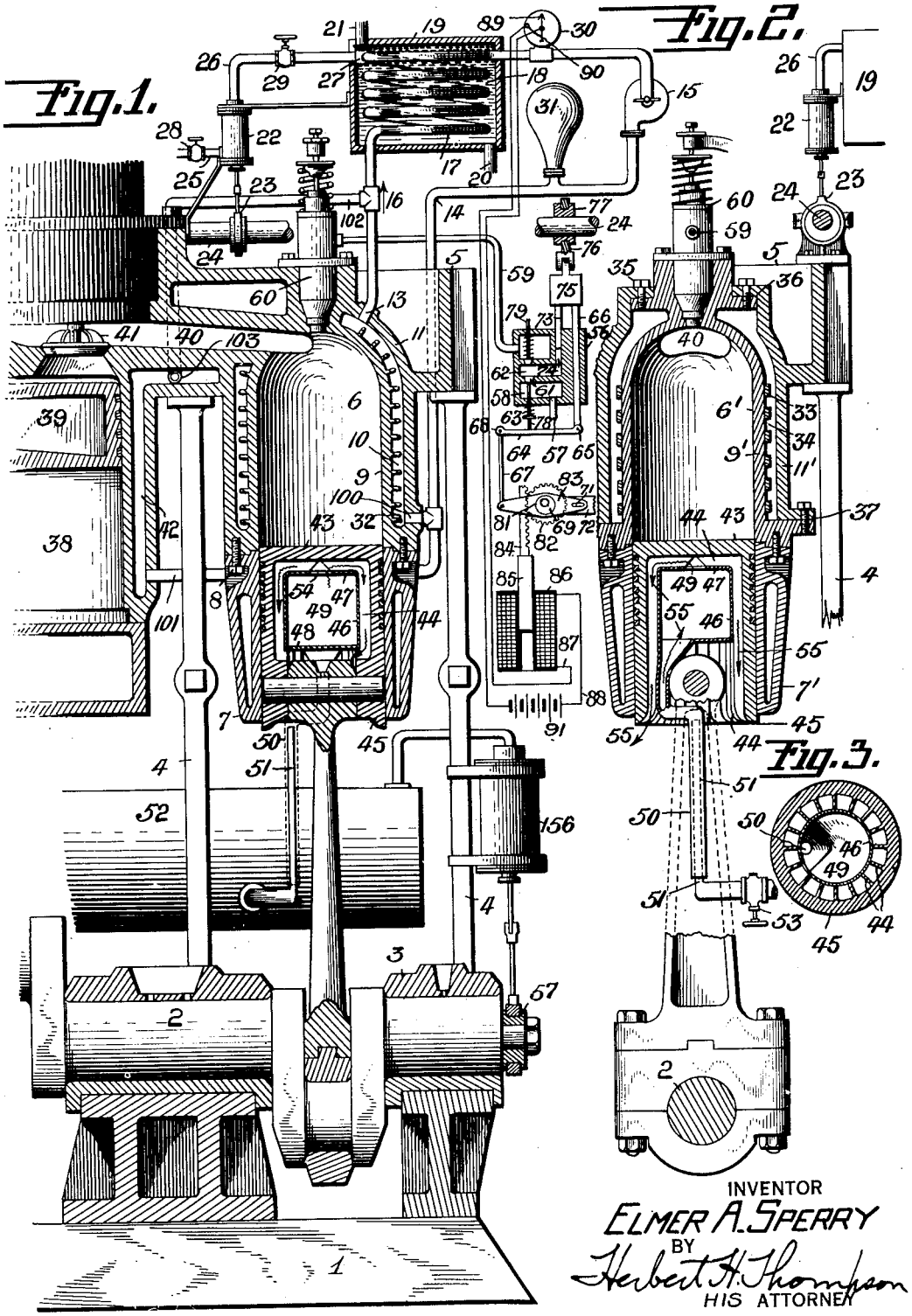
INVENTOR
ELMER A. SPERRY
BY
Herbert H. Thompson
HIS ATTORNEY Patented Aug. 28, 1928.

1,682,357

UNITED STATES PATENT OFFICE.

ELMER A. SPERRY, OF BROOKLYN, NEW YORK, ASSIGNOR TO SPERRY DEVELOPMENT COMPANY, OF DOVER GREEN, DELAWARE, A CORPORATION OF DELAWARE.

INTERNAL-COMBUSTION-ENGINE CYLINDER.

Application filed August 10, 1920. Serial No. 402,657.

This invention relates to internal combustion engines and more especially to large size high power engines, and has for its object to provide a method and means whereby such engines may be built appreciably larger than is now possible.

The present size of internal combustion engines is limited by reason of the fact that as the diameter of the cylinders is increased the thickness of their walls must be increased also and this in turn increases the difficulty of extracting heat from the inner surfaces of the cylinders by cooling fluids in contact with the outer surfaces thereof. Thus thirty inches is about the present extreme limit possible in cylinders, with walls from 1¾" to 2" in thickness. If cylinders were to be made larger, and following present practice also thicker their inner surfaces would become and remain so hot during operation that lubrication would be impossible. The heat would vaporize the lubricant too rapidly to permit it to perform its function.

By the present invention I am able to increase the size of the cylinders without increasing the thickness of the walls, and in fact the thickness of the walls may even be made less than now employed in smaller cylinders.

Referring to the drawings wherein I have shown what I now consider to be the preferred form of my invention:

Fig. 1 is a sectional side elevation of a portion of an engine embodying my invention.

Fig. 2 is an end view showing one cylinder in section and embodying a modification.

Fig. 3 is a sectional view of the piston of the engine.

In the drawings 1 represents the bed plate, which carries the crank shaft 2 in bearings 3. Uprights 4 may be provided to support the cylinder head 5 integral with which may be formed the upper portion of the cylinder 6, the lower portion 7 of said cylinder being secured to the upper portion by means of bolts 8. Adjacent the outer surface of the wall 9 of cylinder 6 I have shown a chamber 10 enclosed by a casing 11 to form a water jacket for the cylinder. Connected at 12 and 13 with chamber 10 are two ends of a water or other cooling fluid pipe 14. A circulating pump 15 may be connected with said pipe to cause circulation of the cooling fluid through chamber 10 and through the pipe as represented by arrows 16. Pipe 14 may be provided with a cooling coil 17 submerged in water 18 in a tank 19. Water may be circulated through said tank through inlet 20 and outlet 21, so as to cool the fluid circulating through the chamber 10.

We have seen that in order to increase the diameter of cylinder 6 it becomes necessary to thicken the wall 9 thereof to sustain the greater pressure that it will be called upon to bear. Also that the present limit in the size of cylinders is due to the fact that any further increase in the thickness of this wall under present practices would render it impossible to keep the inner surface thereof cool enough for lubrication purposes, the heat not being transmitted through the thick wall rapidly enough to be extracted by the water jacket. I propose, therefore, to increase the size of the cylinder without increasing the thickness of the wall thereof beyond the point at which it is possible to effect proper cooling. To this end I propose to apply an initial centripetal or compressing strain upon the cylinder wall. One manner in which this may be accomplished is by maintaining the cooling fluid in chamber 10 under pressure. To do this I may employ a pump 22 actuated by cam connection at 23 to the engine cam rod 24, said pump being fed through pipe 25 and discharging through pipe 26 into the circulation pipe 14 at 27. Valves 28, 29 may be provided for pipes 25, 26. A pressure gauge 30 may be connected to pipe 14 for indicating the pressure of the fluid within said pipe. An air flask or chamber 31 may also be connected with said pipe to impart a small degree of elasticity to the fluid if desired and to allow for changes in volume resulting from changes in temperature.

As shown, I may increase the cooling surface of the cylinder 6 by providing corrugations or cooling fins 32 on the outer surface of the cylinder wall 9. In this connection it is obvious that a non-corrosive cooling fluid may be employed if desired.

In Fig. 2 I have shown a modification wherein, instead of the fins 32 shown in Fig. 1, I may employ flat steel wire or the like 33 wound under tension around the cylinder 6' spaced as at 34 to permit the cooling fluid to engage the wall 9' directly. The wire 33 may serve the double function of cooling fins and a means for applying an initial compressing strain upon the cylinder. In order to facilitate the application of the wire or hoops 33, the jacket 11' may be a separate piece secured to the cylinder as by means of bolts 35 at 36, 37.

While I have shown the chamber 10 extending substantially the full length of the gas containing portion of the cylinder, it is obvious that it need not extend so far down as the highest pressures obtain only in the upper portion of the cylinder, decreasing rapidly as expansion takes place.

It will also be understood that my invention may be applied equally well to single expansion and compound engines. In the drawings I have shown a compound engine, the low pressure cylinder being shown at 38 having a piston 39 and being connected to the cylinder 6 which in a compound engine would be a high pressure cylinder by a transfer passage 40 controlled by transfer valve 41. When applied to a single expansion engine, passage 40 may represent the cylinder exhaust. The gases transferred to the low pressure cylinder will, of course, have so expanded by the time they reach said cylinder that ordinarily it is not necessary to apply the initial compression strain to the walls thereof, so that the water jacket 42 may be constructed and maintained in the usual manner. On the other hand, owing to the great diameter of low pressure cylinders and the necessity of thicker walls for large cylinders, I may apply the initial compression to this cylinder also. For this purpose I have shown pipe 14 as having an extension 100 connected at 101 to the lower portion of the water jacket 42, and another extension 102 connected at 103 to the upper portion of said water jacket. The cooling fluid under pressure will thus circulate through the jackets of both the high and low pressure cylinders. The wire or hoops 33 shown in Fig. 2 having an initial compressing strain may or may not be applied to the low pressure cylinder as desired.

With my invention it will be understood that where the highest pressures within the cylinder 6 are 800 pounds per square inch and the water or other cooling medium is under say 400 pounds pressure, the cylinder wall will be called upon to sustain only half of the internal pressure, the other half being balanced by the pressure of the water jacket or other compressing means. Thus the cylinder wall may be but half the thickness that would otherwise be necessary. The jacket 11 must, of course, be of sufficient strength to sustain the pressure at which the cooling fluid is maintained.

In order further to obtain the proper cooling of the cylinder and related parts I have shown a method and means for cooling the piston 43. To this end I have shown the hollow rear portion of said piston as having a number of cooling vanes 44 (Figs. 1, 2, and 3) integral with the side wall 45 of the piston. Supported by these vanes is a lining or circumferential wall 46 closed at the top and bottom by walls 47, 48 forming a chamber 49. A tube 50 communicating with said chamber and integral with the walls thereof is shown reaching downwardly therefrom. A second tube 51 communicating with an air supply tank 52 may telescope into tube 50 to supply air thereto, the telescopic joint of said tubes being sufficiently long to remain unbroken throughout the reciprocatory cycle of the piston 43 with which tube 50 moves. During the operation of the engine, air may be supplied from tank 52 at a rate controlled by valve 53, through tubes 51, 50 to chamber 49, whence it will flow through opening 54 in the upper wall 47 and around the outside of chamber 49 as indicated by arrows 55, washing the interior of piston 43 and the vanes 44. Air may be compressed in tank 52 by means of a pump 156 actuated by a cam connection 57 with crank shaft 2, or in any other suitable manner.

In order to safeguard the cylinder against breakage in the event that the pressure of the water jacket should fall below a predetermined point, I may provide means responsive to the pressure of said water or other fluid to vary the quantity of fuel injected into the cylinder. In this way a fall in said pressure will be followed by a decrease in the fuel injection and a corresponding decrease in the internal cylinder pressure. For this purpose I have shown means for controlling the action of the fuel injection pump 56. This pump is provided with a pipe 57 adapted to supply fuel to chamber 58. A second pipe 59 is adapted to convey fuel from the pump to the fuel injection valve 60. A valve 61 is provided to close communication between chamber 58 and a second chamber 62; said valve being normally held closed by a spring 63. A lever 64 is pivotally connected at 65 to an arm 66 at one end and to a link 67 at 68. Link 67 is in turn pivotally connected to one end of a lever 83 mounted on a cam 81 fixed on a shaft 69 and fulcrumed on a pin 71 fixed in member 72. A pump piston 73 is shown working in a bore 74 which opens into chamber 62. This piston and arm 66 are both attached to a member 75 connected to a ring 76 which rides upon a cam 77 fixed on cam shaft 24. Thus during the operation of the engine the piston 73 and arm 66 are reciprocated up and down. Lifting of arm 66 and the consequent actuation of lever 64 on fulcrum 68 causes said lever to engage stem 78 of valve 61 to open this valve, permitting fuel to flow into and fill chamber 62 and bore 74 as piston 73 recedes. On the downward stroke of said piston and arm 66 fuel is forced back through valve 61, chamber 58, and pipe 57 until lever 64 lowers valve 61 into its seat. At this point continued pressure of piston 73 forces valve 79 open and pumps fuel during the remainder of the stroke through pipe 59 to injection valve 60.

The quantity of fuel forced through valve 79 is the quantity fed to the combustion cylinder 6 for each explosion and may be varied by varying the time at which valve 61 closes with respect to the stroke of pump piston 73, which in turn may be effected as follows:

Fixed on shaft 69 is a gear 82 meshing with a rack 84 which is integral with the core 85 of a solenoid 86. Said solenoid is connected at one end by a conductor 87 to the indicator 89 of pressure gauge 30 and at the other end by conductor 88 through source 91 to a contact 90 adapted to be engaged by said indicator when the pressure of the cooling fluid falls to a predetermined value. Closure of contacts 89, 90 then will effect actuation of solenoid armature 85 and rack 84, causing rotation of gear 82, thus raising lever 83 and also the fulcrum 68 of lever 64. Thus lever 64 will engage stem 78 of valve 61 sooner on its upward stroke and release it later on the downward stroke, and more fuel will be returned through valve 61 and less forced through valve 79.

While I have described the cooling fluid as being under pressure for the purpose of sustaining the cylinder walls under pressure, an important advantage derived from the maintenance of such pressure is the forcing of the cooling fluid into more intimate contact with the cylinder wall which in itself will induce more rapid extraction of heat therefrom. And it is obvious that the fluid pressure may be maintained for this feature alone if desired.

It will be noted that the cooling jackets are shown in a closed circuit system containing cooling medium under great pressure, and each jacket may be hermetically sealed if desired. Also pump 15 and any other connections in the cooling system may be sealed hermetically or otherwise.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In an internal combustion engine, a combustion cylinder, not designed for bearing the whole pressure of combustion, fuel feeding means therefor, means for impressing centripetal force upon said cylinder of sufficient degree to enable said cylinder to bear the pressure of combustion, and electromagnetic means controlled by said force for controlling said fuel feeding means.

2. In an internal combustion engine, a combustion cylinder not designed to bear the whole pressure of combustion, a cooling jacket therefor, fuel feeding means for said cylinder, means for maintaining a cooling fluid under pressure in said jacket for impressing a centripetal force on said cylinder of sufficient degree to enable said cylinder to bear the pressure of combustion, and means controlled by the pressure of the fluid in said jacket for controlling said fuel feeding means.

3. In an internal combustion engine, a combustion cylinder not designed to bear the whole pressure of combustion, a cooling jacket therefor, fuel feeding means for said cylinder, means for maintaining a cooling fluid under pressure in said jacket for impressing a centripetal force on said cylinder of sufficient degree to enable said cylinder to bear the pressure of combustion, and means adapted to be actuated when the force falls to a predetermined degree for controlling said fuel feeding means.

4. In an internal combustion engine, a combustion cylinder not designed to bear the whole pressure of combustion, a cooling jacket therefor, fuel feeding means for said cylinder, means for maintaining a cooling fluid under pressure in said jacket for impressing a centripetal force on said cylinder of sufficient degree to enable said cylinder to bear the pressure of combustion, and means adapted to be actuated when the force falls to a predetermined degree for controlling said fuel feeding means to reduce the supply of fuel to said combustion chamber.

In testimony whereof I have affixed my signature.

ELMER A. SPERRY.